(12) United States Patent
Palaniappan

(10) Patent No.: US 6,599,546 B2
(45) Date of Patent: Jul. 29, 2003

(54) PROCESS AND APPARATUS FOR IN-LINE PRODUCTION OF HEAT-PROCESSED BEVERAGE MADE FROM CONCENTRATE

(75) Inventor: Sevugan Palaniappan, Sugar Land, TX (US)

(73) Assignee: The Coca Cola Company, Atlanta, GA (US)

(*) Notice: Subject to any disclaimer, the term of this patent is extended or adjusted under 35 U.S.C. 154(b) by 45 days.

(21) Appl. No.: 09/860,278

(22) Filed: May 18, 2001

(65) Prior Publication Data

US 2002/0172745 A1 Nov. 21, 2002

(51) Int. Cl.[7] .................................................. A23L 3/00
(52) U.S. Cl. ............................ 426/231; 99/275; 99/536; 426/521
(58) Field of Search ........................ 426/231, 521, 426/590; 99/275, 534, 536

(56) References Cited

U.S. PATENT DOCUMENTS

| 4,583,453 A | | 4/1986 | Torterotot ...................... 99/455 |
| 4,825,042 A | | 4/1989 | Häuslein ...................... 219/283 |
| 4,919,963 A | * | 4/1990 | Heckert ........................ 426/590 |
| 5,283,854 A | | 2/1994 | Schiebelhuth ............... 392/467 |
| 5,865,097 A | * | 2/1999 | Smit ............................... 99/275 |
| 5,970,732 A | | 10/1999 | Menin et al. .................. 62/201 |

FOREIGN PATENT DOCUMENTS

| EP | 0166127 | 1/1986 |
| EP | 0247245 | 12/1987 |
| EP | 0447760 | 9/1991 |
| WO | 00/35302 | 6/2000 |

* cited by examiner

Primary Examiner—George C. Yeung
(74) Attorney, Agent, or Firm—Sutherland, Asbill & Brennan, LLP

(57) ABSTRACT

The invention provides a system and apparatus for producing heat-pasteurized or sterilized beverages from concentrate. The system comprises heating a diluent and combining the first metered diluent stream with a metered stream of beverage concentrate to produce a primary reconstituted beverage solution. The system further provides combining the primary reconstituted beverage solution with a metered second diluent stream to produce a secondary reconstituted solution, wherein the second diluent stream is also directed from the heated diluent, but is cooled to provide direct heat transfer. Various additives may be provided to the beverage solution throughout the system based on their sensitivity to heat, pH and water solubility. The invention provides greater efficiency of production and control over quality and amount of the ingredients in the final beverage.

46 Claims, 2 Drawing Sheets

PROCESS AND APPARATUS FOR IN-LINE PRODUCTION OF HEAT-PROCESSED BEVERAGE MADE FROM CONCENTRATE

FIELD OF THE INVENTION

The present invention relates to the field of commercial beverage production. In particular, the invention relates to improvements in the commercial in-line production of beverages that require reconstitution from concentrated bases and heat pasteurization or sterilization.

BACKGROUND OF THE INVENTION

The commercial production of beverages requires stringent control over cleanliness and the proportionality of blended ingredients. In particular, due to the perishable nature of natural fruit juices, great care must be taken in the pasteurization or sterilization of beverages containing fruit juices. Pasteurization or sterilization typically requires heating the components of the beverage possibly containing bacteria to approximately 175° to 220° Fahrenheit. Heating and cooling of these liquids presents a challenge for optimizing energy efficiency, product quality and minimizing production costs.

Furthermore, the manufacturing process involving the production of beverages from concentrate, such as fruit juices, requires the production of a final product having an appropriate Brix. Brix refers to the soluble solid/sugar content of a fluid. The standard of identity for orange juice in the United States, for example, is 11.8° Brix. When the beverage is made with a concentrate having a starting Brix level of approximately 45° to 75°, carefully controlled dilution is desired to achieve an acceptable final Brix content of the reconstituted beverage. Conventional techniques for dilution typically call for more than 90% of the diluent to be added in a single batch combination, making attainment of the targeted Brix degree difficult.

Furthermore, the conventional production of beverages requires heating for pasteurization or sterilization of either the concentrate or the substantially complete beverage mixture. The energy required to heat such fluids is much greater than that required to heat water, for example. The conventional process further incorporates thermal abuse of flavors and nutrients due to heat degrading. Currently, fruit drink beverages are typically prepared from concentrates requiring a three-step process. First, the concentrated fruit juice is diluted in very large, e.g. 3,000 to 10,000 gallon, blend tanks. Then, additional ingredients, such as pulp, vitamins, minerals, preservatives, colorings or flavorings, are blended with the reconstituted juice. Next, the final beverage is heat-pasteurized or sterilized. Alternatively, some of these additional ingredients that are heat-labile may be added after the pasteurization or sterilization process. Furthermore, in addition to heating the beverage ingredients, there are known alternative pasteurization or sterilization techniques such as filtration, ozonation, and ultraviolet or pulsed light treatment.

Therefore, existing systems for heat-pasteurized or sterilized beverage production require a great deal of energy, and a more efficient system would be desirable. A system that minimizes the required energy and heat abuse of valuable ingredients (such as certain flavorings, nutrients and coloring) would be desirable. Present batch blending techniques of beverage production are insufficient for controlling soluble solids content at the desired accuracy. A system for beverage production that provides improved control over final Brix is needed. A system that also requires less manufacturing equipment floor space and takes less time and labor for reconstituted beverage production would also be desirable.

Therefore, it is an object of the present invention to provide a more efficient system for heat-pasteurized or sterilized beverage production from concentrate that requires less energy than conventional processes.

It is also an object of the present invention to provide a more efficient system for heat-pasteurized or sterilized beverage production from concentrate that results in less degradation of heat-labile beverage components than conventional processes.

It is also an object of the present invention to provide a system for beverage production that provides improved control over the accuracy of the additives and Brix of the final product.

It is also an object of the present invention to provide a system that also requires less manufacturing equipment space and takes less time and labor to produce a reconstituted beverage than conventional techniques.

SUMMARY OF THE INVENTION

The present invention provides a system and apparatus to meet these and other objectives. The invention provides an improved system and apparatus for producing a heat-pasteurized or sterilized beverage from concentrate. In preferred embodiments, the beverage contains fruit juice. The invention provides an improved system and apparatus for producing a heat-pasteurized or sterilized beverage with minimal degradation of heat-labile components. The invention provides a system and apparatus for the production of such a beverage requiring less energy, equipment floor space, labor and time than previously required with more specific control over Brix and other additives content. In summary, the beverage of the present invention is produced more efficiently at a higher level of quality.

DETAILED DESCRIPTION OF THE INVENTION

Figure 1:
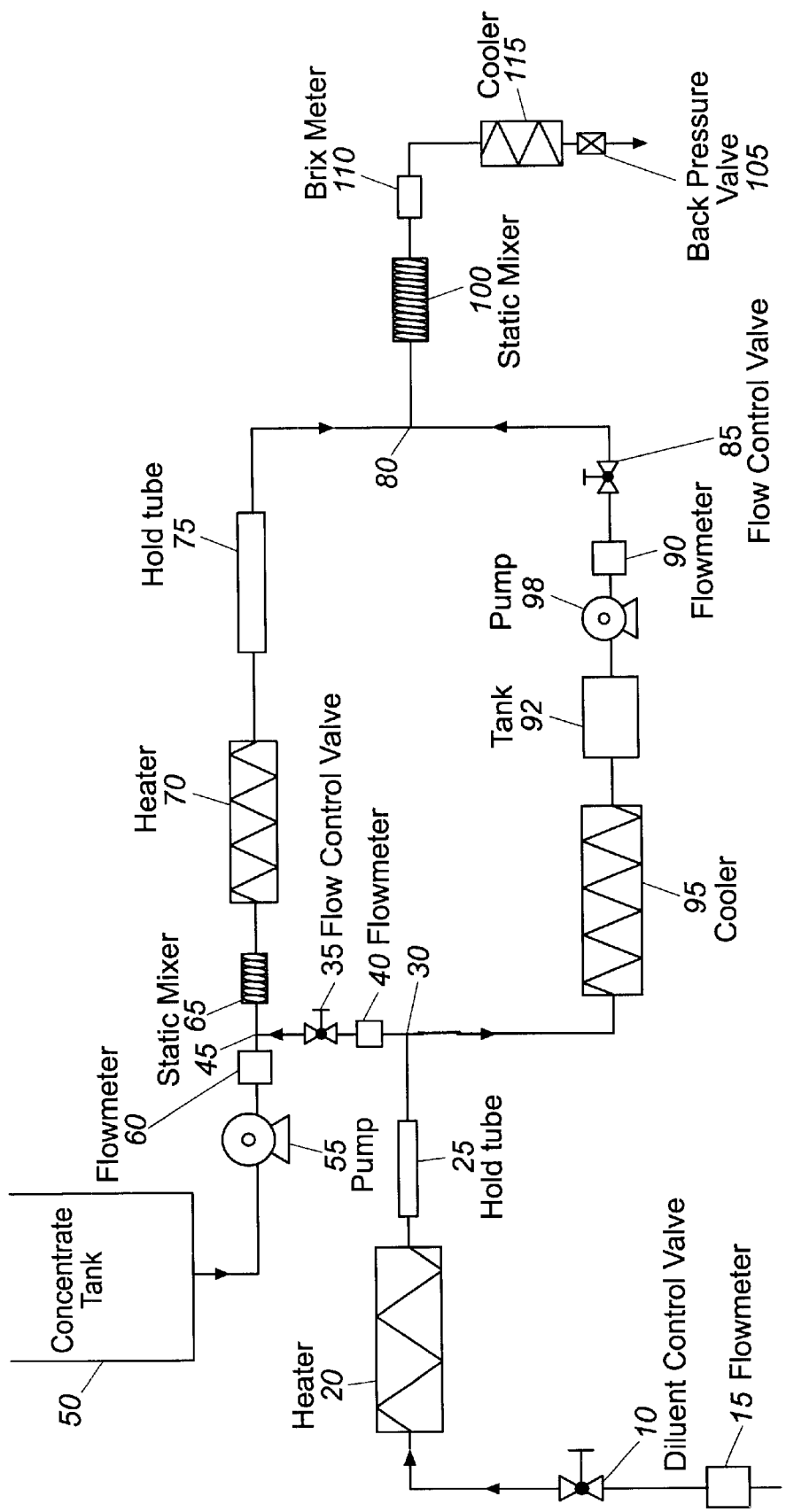
FIG. 1 shows a schematic diagram of one embodiment of the present invention.

The present invention provides a system and apparatus for in-line production of heat-processed beverages from concentrate. The invention provides a system and apparatus for the production of such a beverage requiring less energy, equipment space and time than previously required with more specific control over Brix content. The invention provides a system and apparatus for the production of such a beverage with minimal degraded additives. The beverage of the present invention is produced more efficiently at a higher level of quality.

The present invention provides a dual-stream continuous beverage blending process. The production of a heat-processed beverage includes attainment of a temperature sufficient to pasteurize or sterilize the beverage. A heated diluent is first provided. The heated diluent comprises water primarily, and can contain other components, preferably those that are heat-stable. The diluent can be heated by any heating sources, such as electric resistance, microwave, radio frequency, radiant and other conductive or convective heat sources. Preferably, the diluent is at least partially heated by a conventional heat exchanger. The temperature of the heated diluent can be any temperature above ambient to achieve an efficiency of the present invention, however, the diluent is preferably heated to at least approximately 185° F. in the case where pasteurization is desired, or approximately 220° F. where heat sterilization is desired. The heated diluent may be maintained in a conventional in-line hold tube for the requisite period to inactivate any microbial contaminants. Additionally, the diluent can be treated by filtration, ozonation, UV or pulsed light treatment.

The diluent is directed into two streams. In preferred embodiments, heating occurs prior to divergence of the two streams. In alternative embodiments, heating of the primary diluent occurs after divergence of the primary and secondary diluent streams. The first diluent stream is controlled and metered to combine at a primary dilution junction with a metered stream of beverage concentrate to achieve a primary reconstituted beverage solution at a desired primary Brix. The beverage concentrate can be provided to the system with a positive displacement pump or feed pump.

In some preferred embodiments, the beverage concentrate contains at least some fruit juice. Fruit juices which may be used as the beverages in the present invention include, but are not limited to, orange juice, grapefruit juice, lemon juice, lime juice, tangerine juice, apple juice, pear juice, grape juice, cherry juice, berry juice, pineapple juice, peach juice, apricot juice, plum juice, prune juice, passion fruit juice, cranberry juice, or mixtures thereof. Typically, the starting Brix content of the fruit juice concentrate is about 45° to 75° Brix. The reconstituted primary Brix content after the primary dilution is preferably between about 15° and 45°, more preferably between about 20° and 30° Brix. The invention provides that of the total diluent required to achieve the final Brix of the beverage, the primary diluent stream can provide about 10% to 90%, preferably about 20% to 70%, preferably about 30% to 65%, and preferably about 40% to 60% by volume of the total diluent.

Heating the primary diluent prior to mixing it with the beverage concentrate permits multiple levels of efficiency. Primarily, this results in a lower total energy required to heat pasteurize or sterilize the admixture of diluent and beverage concentrate in the subsequent stage due to the higher thermal conductivity of the primary diluent ingredient, water. Furthermore, the resultant direct heating of the beverage concentrate by admixture with the pre-heated primary diluent is the most efficient form of heating possible, as opposed to the convective or conductive indirect heating otherwise required. Furthermore, this controlled, metered combination of concentrate and heated diluent occurs in-line, and therefore requires no separate prior blend tank, providing a substantial savings of time and equipment floor space than would otherwise be required for a 3,000 to 10,000 gallon blend tank. Further, the energy required to blend the concentrate and diluent is less than in conventional practices, because the cold/ambient (typically 10° to 50° F.) highly viscous concentrate is mixed with warm or hot water.

The primary reconstituted solution is then optionally blended in an in-line static mixer. The primary reconstituted solution is then heat-pasteurized preferably in the range of approximately 175° to 185° F., or heat sterilized preferably in the range of approximately 195° to 220° F., as necessary for packaging and storage of the final product. A heat exchanger can be used at this stage to increase the efficiency of heating the primary reconstituted solution. When the diluent has been previously heat-sterilized prior to in-line combination with the concentrate, a very substantial amount of energy otherwise required to heat the primary reconstituted solution from cold/ambient temperature is not required in this stage due to direct heating by the primary diluent stream. Upon reaching the desired pasteurization or sterilization temperature, the primary reconstituted solution can be maintained in-line, for example in a conventional in-line hold tube, for the necessary time to achieve the requisite microbial reduction.

The second diluent stream is preferably diverted from the diluent supply, before or after diluent heating, metered and combined at a secondary dilution junction with the primary reconstituted solution in-line to create a secondary reconstituted solution. This secondary reconstituted solution is preferably prepared by metering the second diluent stream to achieve the desired approximate final beverage Brix of about 5° to 15° Brix. In the case of orange juice, for example, the desired final Brix is about 10° to 13°, preferably about 11.8°, and preferably about 11.80° Brix for the final beverage. The secondary reconstituted solution can also be optionally blended in an in-line static mixer.

The secondary dilution stage of this dual stream in-line beverage production process allows much greater control of the final Brix, and therefore, a more consistent and higher quality beverage product. The invention provides control of the Brix to an accuracy of 0.1°, and preferably to 0.01° Brix. The invention provides that of the total diluent required to achieve the final Brix content of the beverage, the second diluent stream can provide about 10% to 90%, preferably about 30% to 80%, preferably about 40% to 75%, and preferably about 40% to 60% by volume of the total diluent.

When the diluent has been previously heat-sterilized, the second diluent stream can be cooled prior to combination with the primary reconstituted solution. Cooling of the second diluent can be achieved with a heat exchanger to provide increased efficiency for the overall system. Cooling of the second diluent again provides a very efficient direct heat transfer when combined with the primary reconstituted solution. This system is substantially more energy efficient than cooling the entire reconstituted beverage. Final cooling of the secondary reconstituted solution to about 35° F. may be necessary if the product has been pasteurized, whereas if the product has been sterilized for shelf-stable storage, cooling to only 75° to 85° F. is preferred.

Furthermore, the invention provides pumps, flow meters, control valves, temperature sensors, and Brix meters that can be located in the in-line system at any operable stage. For example, a positive displacement pump can be located between the concentrate holding tank and the junction of the concentrate with the primary diluent stream. Flow control valves can be located in-line of the primary and secondary diluent streams, preferably followed by flow meters. The invention provides that the flow control valves for the diluent streams can be under manual control or automated control of a computer processor that receives input from the flow meters, temperature sensors, pH sensors, pumps and Brix meter. In this way, an automated system having a programmable logic controller provides multiple feedback and forward control loops for the efficient, continuous, dual stream, in-line production of beverages made from concentrate with a highly controlled Brix. The invention contemplates any number of subsequent diluent streams for the precise control of final Brix.

The invention provides that additional beverage additives may be provided to the in-line system at any operable stage. Such additives can be provided in one or more additive diluent streams. For example, vitamins, minerals, preservatives, colorings, flavorings, botanical extracts, or carbonation can be added in solution at stages as required based on the sensitivity of the additive compound to heat and acidity. Heat-stable additives (e.g. certain flavorings) and acid-stable/requiring additives (e.g. calcium salts) can be added to the primary reconstituted beverage solution prior to heat-pasteurization or sterilization. Heat-labile and water-soluble additives, such as other nutrients and flavors, can be added as a subsequent additive diluent stream, and can be further filtered, ozonated or UV or pulse light treated as necessary, and mixed in-line with the secondary reconstituted solution. Additionally, heat-labile water-insoluble additives, such as certain flavorings, botanical extracts, and vitamins, can be sterilized by filtration, ozonation or UV or pulse light treatment, and added directly to the secondary reconstituted solution. Microbial cultures and carbonation can also be added after heat-processing the reconstituted solution, since the heat exchange process impacts these ingredients. To the extent that any of these additives are suspended in a monitored stream of diluent, this system provides additional subsequent reconstituted solutions, and increased resultant control over the final Brix and other additives.

Therefore, the present invention also provides an apparatus for in-line production of a heat-processed fruit juice-containing beverages reconstituted from concentrate. In one embodiment, the apparatus comprises diluent control valve, a diluent flow meter in fluid communication with a downstream first diluent stream flow control valve and a first diluent stream flow meter. The apparatus comprises a diluent heater which is in either upstream or downstream communication with the first diluent stream flow control valve and first diluent stream flow meter. The apparatus further comprises a beverage concentrate tank in fluid communication with a beverage concentrate control valve and a beverage concentrate flow meter; and a primary reconstitution junction in downstream fluid communication with the first heated diluent stream and the beverage concentrate to produce a primary reconstituted beverage solution. The embodiment further comprises a primary reconstituted beverage solution heater in downstream fluid communication with the primary reconstitution junction; and, a final Brix meter in downstream communication with the primary reconstituted beverage solution heater.

In preferred embodiments, the apparatus has a feed pump located between the beverage concentrate tank and the primary reconstitution junction of the concentrate with the first diluent stream. In preferred embodiments, the diluent heater operates by electric resistance, microwave, radio frequency, radiant, conductive or convective heat sources, and/or a heat exchanger. In preferred embodiments, the diluent heater is in fluid communication with a downstream in-line hold tube to maintain the heated diluent for a period of time sufficient to inactivate microbial contaminants. In preferred embodiments, the primary reconstitution junction is in fluid communication with a downstream in-line static mixer and upstream of the primary reconstituted solution heater. In preferred embodiments, the primary reconstituted solution heater operates by electric resistance, microwave, radio frequency, radiant, conductive or convective heat sources, and/or a heat exchanger. In preferred embodiments, the primary reconstituted solution heater is in fluid communication with a downstream in-line hold tube to maintain the heated diluent for a period sufficient to inactivate microbial contaminants.

The invention provides in certain embodiments a second diluent stream flow control valve and a second diluent stream flow meter. Preferably, the secondary diluent stream diverges from the diluent and primary diluent stream at a diluent diverter. In some embodiments, the diluent diverter is upstream of the diluent heater, and in other embodiments, the diluent diverter is downstream of the diluent heater. The apparatus comprises a secondary reconstitution junction in downstream fluid communication with the primary reconstituted solution and the secondary diluent stream to produce a secondary reconstituted beverage solution. In preferred embodiments, the apparatus further comprises an in-line static mixer in downstream communication with the secondary reconstitution junction and the final Brix meter. In a general reconstituted beverage system, the product then goes to the filler or aseptic surge tank, which is in communication with an optional final cooler.

In other preferred embodiments, the apparatus further comprises a secondary diluent cooler in downstream fluid communication with the second diluent stream flow meter and in upstream fluid communication with the secondary reconstitution junction. In preferred embodiments, the cooler is a heat exchanger. Furthermore, the apparatus can comprise a pressurized holding tank downstream of this secondary diluent cooler, followed by a positive displacement pump and flow meter to accurately control the addition of secondary diluent with the primary reconstituted beverage solution.

In other preferred embodiments, the apparatus further comprises a heat-labile, water-soluble additive diluent stream and additive junction in fluid communication with the secondary, or another, diluent stream. In preferred embodiments, the apparatus further comprises a heat-stable additive diluent stream and additive junction in fluid communication with the primary reconstituted solution upstream of the heater. In other preferred embodiments, the apparatus further comprises a heat-labile water-insoluble additive diluent stream and additive junction in fluid communication with the secondary reconstituted solution. In preferred embodiments, the flow control valves for the diluent streams are under the manual or automated control of a processor that receives input from flow meters, temperature sensors and at least one Brix meter.

The invention provides various apparatuses for use with the above-described invention. By the phrase "in communication" or "in fluid communication" in this document is meant that the apparatus provides a conduit for the continuous flow of fluid between two elements, and the terms "upstream" and "downstream" refer generally to relative positions within the apparatus, however, it is understood that other elements of the apparatus (such as but not limited to a flow meter, valve, piping, etc.) may also lie therebetween.

With reference to FIG. 1, an exemplary apparatus includes: diluent supply control valve 10 in fluid communication with a diluent heater 20. In most cases, the diluent is simply water, however, other components such as heat-stable additives may also be present. A flow meter 15 is shown to monitor the amount of diluent entering the system. An in-line hold tube 25 is shown for maintaining the diluent for a time necessary to inactivate microbial contaminants. Inactivating a contaminant refers to the reduction of at least some compounds or organisms, such as bacteria, that would have a deleterious effect on the product. The diluent can be heated by heating sources, such as electric resistance, microwave, radio frequency, radiant and other conductive or convective heat sources. Preferably, the diluent is partially heated by a conventional heat exchanger. The temperature of the heated diluent can be any temperature above ambient to achieve an efficiency of the present invention, however, the diluent is preferably heated to at least approximately 185° F. in the case where pasteurization is desired, or approximately 220° F. where heat sterilization is desired.

The heated diluent is then directed into two streams at diluent diverter 30. The first diluent stream passes through a flow meter 40 and control valve 35 to combine with a metered stream of fruit juice concentrate at primary diluent junction 45. The fruit juice concentrate comes from a concentrate tank 50, through a feed pump 55 and flow meter 60 before entering primary diluent junction 45. Thereafter, the combined primary reconstituted solution is blended in a static mixer 65 before traveling to the primary reconstituted solution heater 70. Typically, the starting Brix of the fruit juice concentrate is about 60. The reconstituted primary Brix after primary dilution is preferably between about 30 and 35.

Because the diluent is heated prior to mixing it with the fruit juice beverage concentrate, less energy is required to heat pasteurize or sterilize the admixture of diluent and beverage concentrate in this stage. The primary reconstituted solution is either heat-pasteurized, preferably in the range of approximately 175° to 185° F., or heat sterilized, preferably in the range of approximately 195° to 220° F., as necessary for the desired packaging and storage of the final product. A heat exchanger may be used at this stage to deliver any heat required by the primary reconstituted solution to obtain the process temperature. Upon reaching the desired pasteurization or sterilization temperature, the primary reconstituted solution can be maintained in-line in a conventional in-line hold tube 75, for the necessary time to achieve the requisite microbial reduction.

The heat-treated primary reconstituted solution is combined in-line with a second diluent to create a secondary reconstituted solution. The second stage dilution allows the operator to achieve the desired approximate Brix, for example of about 5° to 15°, or 10° to 13°, or preferably about 11.8° or 11.80° for the final fruit juice beverage. This secondary reconstituted solution is preferably prepared by combining the primary reconstituted solution with the second diluent stream from the diluent diverter 30 of heated diluent. The second diluent can also be provided from a separate source.

The second diluent is directed to a cooler 95, such as a heat exchanger, prior to secondary dilution junction 80 with the primary reconstituted solution. Because the second diluent is cooled, preferably to 35° F., less energy is required to cool the primary reconstituted solution. The second diluent is directed into a pressurized holding tank 92 and continues to a positive displacement pump 98 and flow meter 90. This second diluent is shown as being directed through a flow control valve 85. Thereafter, the secondary reconstituted beverage solution is blended in an in-line static mixer 100 and the Brix determined at Brix meter 110. In the case of beverages requiring refrigeration, such as those pasteurized, an additional cooler 115 is provided. The embodiment shown provides a back-pressure valve 105.

Figure 2:
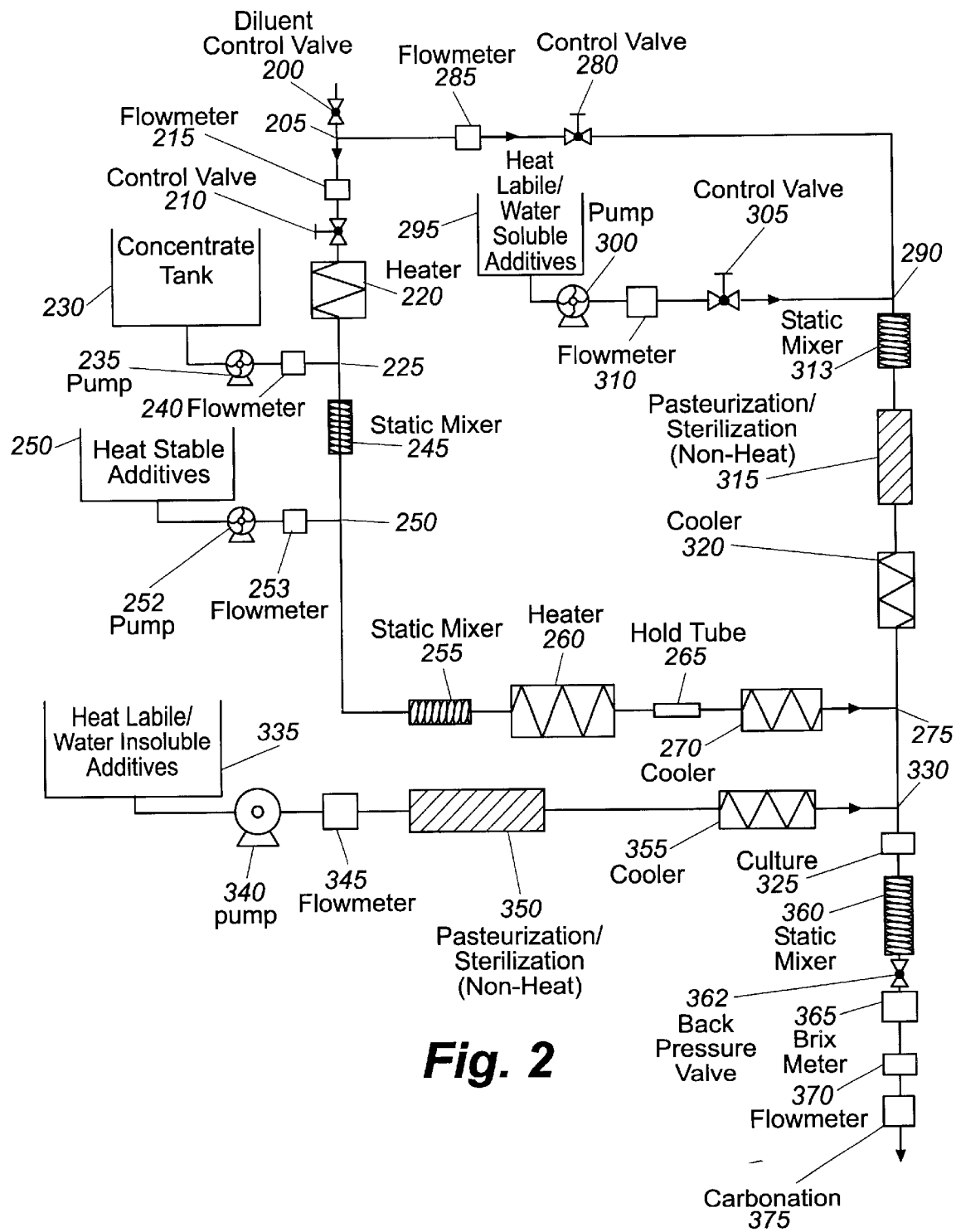
FIG. 2 shows a schematic diagram of another embodiment of the present invention.

The invention provides that additional fruit juice beverage additives may be provided to the in-line system at any operable stage. For example, vitamins, minerals, preservatives, colorings, flavorings, botanical extracts, microbial cultures, or carbonation can be added at stages as required based on the sensitivity of the additive compound to heat and acidity. FIG. 2 shows a configuration where diluent control valve 200 is diverted into two streams at diluent diverter 205, wherein the primary diluent stream passes through flow meter 215 and control valve 210 prior to entering diluent heater 220. The heated primary diluent stream is combined with the fruit juice concentrate at primary diluent junction 225. The concentrate is shown as originating from the concentrate tank 230 at a Brix of about 65°, before passing through a feed pump 235 and flow meter 240 upstream of the primary diluent junction 225. Thereafter, the primary reconstituted solution is passed though a static mixer 245, and results in a Brix of about 30° in the case of fruit juice.

The primary reconstituted solution is combined at heat-stable additive junction 250 with heat-stable additives, such as certain nutrients and flavors, prior to heat-pasteurization. The heat-stable additives tank 251 holds these components prior to passage through feed pump 252 and flow meter 253. It is understood that multiple different heat-stable additives can be combined with the primary reconstituted beverage solution at this stage. For example, multiple streams of additives may be added for water soluble, alcohol-based, or water insoluble materials. Minerals such as calcium salts, which would require acidity of the beverage to stay in solution, can be added at this stage. The flow meter(s) 253 will keep track of the dilution effect in order to establish a final product with the desired Brix. A programmable logic controller can monitor and control each stream of concentrate, diluent and additive for flow volume, pressure, temperature, pH and/or Brix to assure the recipe of each beverage product is followed accurately.

The additives and reconstituted beverage are thoroughly blended in a static mixer 235 and directed to heater 260 for pasteurization at 175° F. to 185° F., or sterilization at 195° F. to 220° F. A hold tube 265 maintains the solution at heated temperatures for the time necessary to inactivate any microbial contaminants. The beverage solution is directed to cooler 270, for those pasteurized products. At secondary dilution junction 275 the primary reconstituted solution (containing heat-stable additives) is combined with a second diluent. The second diluent originates from a divergence in the water diluent stream at diluent diverter 205, which stream is monitored at flow meter 285 and controlled at valve 280. In addition, the second diluent stream is combined with heat-labile water-soluble additives, for example certain nutrients and flavors, at additive junction 290. Those additives are provided from tank 295 through feed pump 300, flow meter 310 and control valve 305 to the additive junction 290. A mixer 313 is also provided to blend the additives and the second diluent stream. To the extent these and other additives are suspended in additional diluents, this system provides tertiary or greater reconstituted solutions, and increased resultant control over the final Brix.

Optionally, botanical extracts may be added to the second diluent stream from just prior to the static mixer 313 and later. The second diluent stream containing the heat-labile water-soluble additives is treated to inactivate microbial contaminants by filtration, ozonation, UV or pulsed light at station 315. Thereafter, the secondary diluent stream is directed to a heat exchanging cooler 320.

At secondary dilution junction 275, the primary reconstituted beverage solution and the secondary diluent stream are combined to form the secondary reconstituted solution. At additive junction 330 the secondary reconstituted solution is combined with heat-labile water-insoluble additives, such as certain flavorings and vitamins, provided from tank 335 though feed pump 340 monitored by flow meter 345. At stage 350, this additive mixture can be sterilized by filtration, ozonation or UV or pulse light treatment, before being directed to cooler 355 and junction 330 with the secondary reconstituted beverage solution. Optionally, cultures of beneficial microorganisms can be added to the secondary reconstituted beverage solution at station 325. The secondary reconstituted beverage solution, as reconstituted with monitored amounts of auxiliary additive diluents, is passed through a static mixer 360, back-pressure valve 362 and monitored at Brix meter 365 for the desired Brix and rate by flow meter 370. Carbonation can be added at station 375. The fruit juice beverage is then ready for filling into containers or aseptic storage tanks.

These and other features and embodiments of the invention will be apparent to one of skill in the art upon reading the specification and appended claims. The embodiments in this description are not intended to be limiting to the scope of the claims, but rather are intended to be exemplary of the full scope and spirit of the invention contemplated herein.

I claim:

1. A process for in-line production of a heat-processed beverage from concentrate, comprising: heating a diluent, directing the heated diluent to a flow meter to form a metered primary diluent stream; combining the primary diluent stream with a metered stream of beverage concentrate to produce a primary reconstituted beverage solution, and combining the primary reconstituted beverage solution with a metered second diluent stream to produce a secondary reconstituted beverage solution, thereby producing the heat-processed beverage from concentrate.

2. The process of claim 1, wherein the diluent is heated by electric resistance, microwave, radio frequency, radiant, conductive or convective heat sources.

3. The process of claim 1, wherein the diluent is heated to at least approximately 185° F.

4. The process of claim 1, wherein the diluent is heated to at least approximately 220° F.

5. The process of claim 1, wherein the heated diluent is further maintained in an in-line hold tube for a period sufficient to inactivate contaminants.

6. The process of claim 1, wherein the diluent diverges into the primary diluent stream and the second diluent stream at a diluent diverter.

7. The process of claim 6, wherein the diluent is heated prior to divergence at the diverter.

8. The process of claim 6, wherein the primary diluent is heated after divergence at the diverter.

9. The process of claim 1, wherein the beverage concentrate contains fruit juice and the Brix of the beverage concentrate is about 45° to 75°.

10. The process of claim 9, wherein the Brix of the primary reconstituted beverage solution is between about 15° and 45°.

11. The process of claim 9, wherein the Brix of the primary reconstituted beverage solution is between about 20° and 30°.

12. The process of claim 1, further comprising blending the primary reconstituted beverage solution in an in-line static mixer.

13. The process of claim 1, further comprising heating the primary reconstituted beverage solution to approximately 175° F. to 220° F.

14. The process of claim 1, wherein the primary reconstituted beverage solution is further maintained in an in-line hold tube after heating for a period sufficient to inactivate contaminants.

15. The process of claim 1, further comprising cooling the metered second diluent stream prior to combination with the primary reconstituted beverage solution.

16. The process of claim 15, further comprising cooling the second diluent stream to less than 35° F.

17. The process of claim 1, wherein the beverage concentrate contains fruit juice and the secondary reconstituted beverage solution has a Brix of about 5° to 15°.

18. The process of claim 17, wherein the secondary reconstituted beverage solution has a Brix of about 10° to 13°.

19. The process of claim 17, wherein the secondary reconstituted beverage solution has a Brix of about 11.8°.

20. The process of claim 1, further comprising blending the secondary reconstituted beverage solution in an in-line static mixer.

21. The process of claim 1, wherein the primary diluent stream provides about 10% to 90% by volume of the total diluent in the beverage.

22. The process of claim 1, wherein the primary diluent stream provides about 20% to 70% by volume of the total diluent in the beverage.

23. The process of claim 1, wherein the primary diluent stream provides about 30% to 65% by volume of the total diluent in the beverage.

24. The process of claim 1, wherein the primary diluent stream provides about 40% to 60% by volume of the total diluent in the beverage.

25. The process of claim 1, wherein the second diluent stream provides about 10% to 90% by volume of the total diluent in the beverage.

26. The process of claim 1, wherein the second diluent stream provides about 30% to 80% by volume of the total diluent in the beverage.

27. The process of claim 1, wherein the second diluent stream provides about 40% to 75% by volume of the total diluent in the beverage.

28. The process of claim 1, wherein the second diluent stream provides about 40% to 60% by volume of the total diluent in the beverage.

29. The process of claim 1, wherein heat-labile water-soluble additives are added to the second diluent stream.

30. The process of claim 1, wherein heat-stable additives are added to the primary reconstituted beverage solution prior to heating.

31. The process of claim 1, wherein heat-labile water-insoluble additives are added to the secondary reconstituted beverage solution.

32. The process of claim 1, wherein one or more flow control valves and one or more pumps for controlling the diluent streams are under manual control or automated control of a computer processor that receives input from at least one flow meter, temperature sensor or Brix meter.

33. An apparatus for in-line production of a heat-processed beverage from concentrate, comprising:

a diluent heater in fluid communication with a first diluent stream flow meter and a first diluent stream flow control valve;

a beverage concentrate tank in fluid communication with a downstream beverage concentrate pump and a beverage concentrate flow meter;

a primary dilution junction in downstream fluid communication with the first diluent stream and the beverage concentrate to produce a primary reconstituted beverage solution;

a primary reconstituted beverage solution heater in downstream fluid communication with the primary dilution junction;

a second diluent stream flow meter and a second diluent stream flow control valve;

a secondary dilution junction in downstream fluid communication with the primary reconstituted beverage solution and the second diluent stream flow control valve to produce a secondary reconstituted beverage solution, and a Brix meter in downstream communication with the secondary dilution junction.

34. The apparatus of claim 33, wherein a pump is located in fluid communication between the beverage concentrate tank and the primary dilution junction.

35. The apparatus of claim 33, wherein the diluent heater operates by electric resistance, microwave, radio frequency, radiant, conductive or convective heat sources.

36. The apparatus of claim 33, wherein the diluent heater is in fluid communication with a downstream in-line hold tube to maintain the heated diluent a period sufficient to inactivate contaminants.

37. The apparatus of claim 33, wherein the second diluent stream is in downstream communication with the diluent heater.

38. The apparatus of claim 33, wherein the primary reconstituted beverage solution heater is in fluid communication with a downstream in-line hold tube to maintain the primary reconstituted beverage solution for a period sufficient to inactivate contaminants.

39. The apparatus of claim 33, further comprising an in-line static mixer in downstream communication with the secondary reconstituted beverage solution junction.

40. The apparatus of claim 33, further comprising a second diluent cooler in upstream fluid communication with the secondary dilution junction.

41. The apparatus of claim 40, further comprising a second diluent holding tank and a downstream pump, both in downstream fluid communication with the second diluent cooler and in upstream fluid communication with the second diluent stream flow meter.

42. The apparatus of claim 33, wherein the second diluent stream flow meter is in downstream fluid communication with the diluent heater.

43. The apparatus of claim 33, further comprising a heat-labile water-soluble additive junction in fluid communication with the secondary diluent stream.

44. The apparatus of claim 33, further comprising a heat-stable additive junction in fluid communication with the primary reconstituted beverage solution upstream of the heater.

45. The apparatus of claim 33, further comprising a heat-labile water-insoluble additive junction in fluid communication with the secondary reconstituted beverage solution.

46. The apparatus of claim 41, wherein the flow control valves and pumps for the diluent streams are under the automated control of a computer processor that receives input from at least one flow meter, temperature sensor or Brix meter.

* * * * *